(12) United States Patent
Kano

(10) Patent No.: US 8,422,361 B2
(45) Date of Patent: Apr. 16, 2013

(54) MANAGEMENT OF PROTECTION PATH BANDWIDTH AND CHANGING OF PATH BANDWIDTH

(75) Inventor: Shinya Kano, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 246 days.

(21) Appl. No.: 11/947,095

(22) Filed: Nov. 29, 2007

(65) Prior Publication Data
US 2008/0170496 A1 Jul. 17, 2008

(30) Foreign Application Priority Data
Jan. 15, 2007 (JP) .................. 2007-006100

(51) Int. Cl.
*G01R 31/08* (2006.01)
*G08C 15/00* (2006.01)

(52) U.S. Cl.
USPC .......................................... 370/225; 370/227

(58) Field of Classification Search .................. 370/225, 370/227
See application file for complete search history.

(56) References Cited

U.S. PATENT DOCUMENTS

| 5,003,531 | A | 3/1991 | Farinholt et al. |
| 5,274,641 | A | 12/1993 | Shobatake et al. |
| 6,512,611 | B1 * | 1/2003 | Phelps et al. ........................ 398/4 |
| 6,795,394 | B1 * | 9/2004 | Swinkels et al. ............... 370/222 |
| 7,095,712 | B2 | 8/2006 | Kinoshita et al. |
| 7,451,340 | B2 * | 11/2008 | Doshi et al. ........................ 714/4 |
| 2002/0141334 | A1 * | 10/2002 | Deboer et al. ................. 370/227 |
| 2002/0172150 | A1 | 11/2002 | Kano |
| 2003/0021225 | A1 | 1/2003 | Klink |
| 2004/0042402 | A1 * | 3/2004 | Galand et al. .................. 370/237 |
| 2004/0193724 | A1 * | 9/2004 | Dziong et al. ................. 709/232 |
| 2005/0122899 | A1 * | 6/2005 | DeBoer et al. ................. 370/222 |
| 2007/0036073 | A1 * | 2/2007 | Yamada et al. ................ 370/225 |
| 2007/0086331 | A1 * | 4/2007 | Manral et al. .................. 370/223 |

FOREIGN PATENT DOCUMENTS

| EP | 1 096 712 | 5/2001 |
| JP | 4-100343 | 4/1992 |
| JP | 2002-344491 | 11/2002 |
| JP | 2002-344493 | 11/2002 |
| JP | 2005-210514 | 8/2005 |

OTHER PUBLICATIONS

"WD3_NCE_03rl: MPLS Ring Protection Switching" Working Party: Sep. 3, 2004.
Network Working Group "Multiprotocol Label Switching Architecture" Request for Comments: 3031, Jan. 2001.
Network Working Group "MPLS Label Stack Encoding" Request for Comments: 3032, Jan. 2001.
Network Working Group "RSVP-TE: Extensions to RSVP for LSP Tunnels" Request for Comments: 3209, Dec. 2001.

(Continued)

Primary Examiner — Mark Rinehart
Assistant Examiner — Angel Brockman
(74) Attorney, Agent, or Firm — Katten Muchin Rosenman LLP

(57) ABSTRACT

A highly efficient protection path bandwidth management method is provided. When a protection path is set up in a loop with a node A as the starting point and endpoint in order to protect a working path, the bandwidth of the protection path is changed by transferring a bandwidth change request message, containing the identifier of the protection path as well as the value of the bandwidth after the change, so as to cycle once around the protection path set up in a loop starting from a node B that first received a PATH message for a working path.

13 Claims, 19 Drawing Sheets

OTHER PUBLICATIONS

Notice of Reasons for Rejection dated May 12, 2009, for corresponding Japanese Application 2007-006100.
European Communication Pursuant to Article 94(3) EPC dated Mar. 12, 2010, from the corresponding European Application.
N. Chandhok, et al. "IP over Optical Networks: A Summary of Issues" IPO and MPLS Working Groups, Internet Draft, Mar. 2001.
European Search Report dated Jul. 7, 2008, from the corresponding European Application.

* cited by examiner

MANAGEMENT OF PROTECTION PATH BANDWIDTH AND CHANGING OF PATH BANDWIDTH

BACKGROUND OF THE INVENTION

1. Field of the Invention

The present invention relates to a method for managing protection path bandwidth when using a protection path set up in a loop to recover from a failure occurring in at least a portion of a path, and a method for changing the path bandwidth, and more particularly to a method for managing protection path bandwidth in an MPLS (Multi-Protocol Label Switching) network and a method for changing the bandwidth.

2. Description of the Related Art

To transfer packets such as IP (Internet Protocol) packets at high speed, there has been developed a technology known as MPLS (Multiprotocol Label Switching) in which a short fixed-length label is attached at the head of each packet in addition to the header information contained therein and the packet is transferred using the thus attached label.

Each node maintains a label table which shows incoming interface numbers, outgoing labels corresponding to incoming labels, and outgoing interface numbers. The node that received a packet with a label attached to it determines the outgoing label and the outgoing interface number from the label of the received packet and the incoming interface number by referring to the label table, replaces the label of the packet with the thus determined outgoing label, and outputs the packet on the outgoing interface designated by the thus determined number. This simplifies packet header processing and achieves high-speed packet transfer at layer 2 (refer to RFC3031 and RFC3032).

In the example shown in FIG. 1, node 2 that received a packet 10 having a label A via an IF #1 refers to the label table 12 maintained therein, recognizes that the packet 10 is a packet being forwarded on a path whose path ID is "1", and determines that the outgoing label is "B" and the outgoing interface number is "2", therefore, the label is replaced with "B" and the packet is output as a packet 14 from an IF #2. In this way, an MPLS path 16 passing through node 1, node 2, node 3, and node 4 is established.

To establish the path by constructing the label table at each node on the path, the signaling protocol RSVP-TE (Resource reSerVation Protocol-Traffic Engineering) shown in FIG. 2 is used. In FIG. 2, the source node 1 requesting a path setup transmits a PATH message 18, which specifies path identifier (ID 1) and required bandwidth as well as the route (relay nodes) up to the path terminating node 4, hop by hop toward the terminating node 4. Upon reception of the PATH message 18, each of the relay nodes 2 and 3 checks whether the bandwidth requested by the message is available or not, and forwards the PATH message 18 to the next node only when the requested bandwidth is available. Then, the terminating node 4 checks whether the bandwidth requested by the PATH message is available or not and, only when the bandwidth is available, assigns the label ("C" in the example shown) used in the section between the nodes 3 and 4 to this path and returns a RESV message 20 containing this label to the source node 1. Using this RESV message, the label assigned in accordance with the label request is notified to each subsequent node.

JP 2002-344493 and WD3 NCE 03r1, ITU-T, Q3/13, Q9/15, 20-24 September 2004, each describe the use of a ring network to recover from an MPLS path failure. In other words, as shown in FIG. 3, ring networks 22, 24, 26, and 28 are assumed as indicated by dashed lines within an MPLS network which is a mesh network, and failure recovery is performed within each ring network. For example, as shown in FIG. 4, a protection path 30 is set up along the ring connecting the nodes A to F, to recover from failure that may occur on working paths 32 and 34 each of which passes through a portion of this ring. For example, suppose that a link failure occurs between the nodes B and C; then, when a packet arrives at the node B located at one end of the failed link, the label assigned to the protection path 30 is attached at the head of the packet, and the packet is re-routed in the opposite direction along the ring. When the packet arrives at the node C at the other end of the failed link, the label of the protection path is removed, and the packet is transferred in the reverse direction, i.e., in the originally intended direction.

A detailed procedure for setting up a loop MPLS path as a protection path is described in JP 2002-344493.

Here, if prescribed quality is to be maintained when using a protection path, the following relation must be satisfied.

Total bandwidth of all working paths ≦ Bandwidth of protection path

For this purpose, half of the link bandwidth is fixedly preallocated to the protection path.

However, since every path is not necessarily a path that must be backed up by a protection path to maintain its quality of service, fixedly preallocating the protection path bandwidth would be wasteful of the bandwidth.

Further, when two protection paths, each set up in a loop, share the same link portion, if the bandwidth of each protection path is fixedly preallocated for the shared link portion, there arises the problem that the bandwidth cannot be allocated flexibly, i.e., even when the total bandwidth of the paths protected by one of the loop protection paths is small, the bandwidth of the other loop protection path cannot be increased to increase the bandwidth of the paths that can be protected by that other loop protection path.

There has therefore been a need for a mechanism that can increase or decrease the bandwidth of each protection path as needed, rather than fixedly preallocating bandwidth to each protection path.

RFC3039 describes that the bandwidth of an already established path is changed by exchanging a PATH message and RESV message having the identifier of the same path as the currently set up path and the value of the changed bandwidth between the starting point and the endpoint of the path.

However, no description is given about changing the bandwidth of a loop path or about changing the bandwidth starting from a node other than the node at the starting point of the path. It may be possible to apply the method of this document by taking as the starting point and endpoint the node that was the starting point and endpoint when the loop protection path was set up, but this method cannot be applied directly since the PATH message for the newly set up path does not necessarily pass through this node.

SUMMARY OF THE INVENTION

It is an object of the present invention to provide a method of protection path bandwidth management that can efficiently use limited resources.

It is another object of the invention to provide a method for changing the bandwidth of a path set up in a loop.

It is a further object of the invention to provide a method for changing the bandwidth of a path, starting from a node other than the node at the starting point of the path.

According to the present invention, there is provided a method of managing protection path bandwidth when using a protection path set up in a loop to recover from a failure occurring in at least a portion of a path, comprising: setting up a protection path in a loop in response to a first request for setting up a first path passing through a first portion of the loop; comparing, in response to a second request for setting up or removing a second path passing through a second portion of the loop, a bandwidth of paths to be protected when the second path is set up or removed, with a bandwidth of said protection path; and changing the bandwidth of the protection path in accordance with a result of the comparison.

Preferably, the comparison is made at a first node that received, earlier than any other node on the loop, a first message requesting the setting up or removal of the second path, and changing the bandwidth of the protection path includes transferring from the first node along the loop a second message requesting the changing of the bandwidth of the protection path.

According to the present invention, there is also provided a method of changing a bandwidth of a path set up in a loop with the same first node as a starting point and an endpoint, comprising: sending out from a second node a first message that cycles once around the loop, the second node being a node different from the first node on the loop; and in response to reception of the first message, sending out from the second node a second message that cycles once around the loop.

According to the present invention, there is also provided a method of changing a bandwidth of a path set up with a first node as a starting point and a second node as an endpoint from a third node which is a node on the loop other than the first and second nodes, comprising: transferring a first message along the path from the third node to one of the first and second nodes; transferring, in response to reception of the first message, a second message along the path from one of the first and second nodes to the other one of the first and second nodes; and transferring, in response to reception of the second message, a third message along the path from that other one of the first and second nodes to the third node.

DESCRIPTION OF THE PREFERRED EMBODIMENTS

Figure 1:
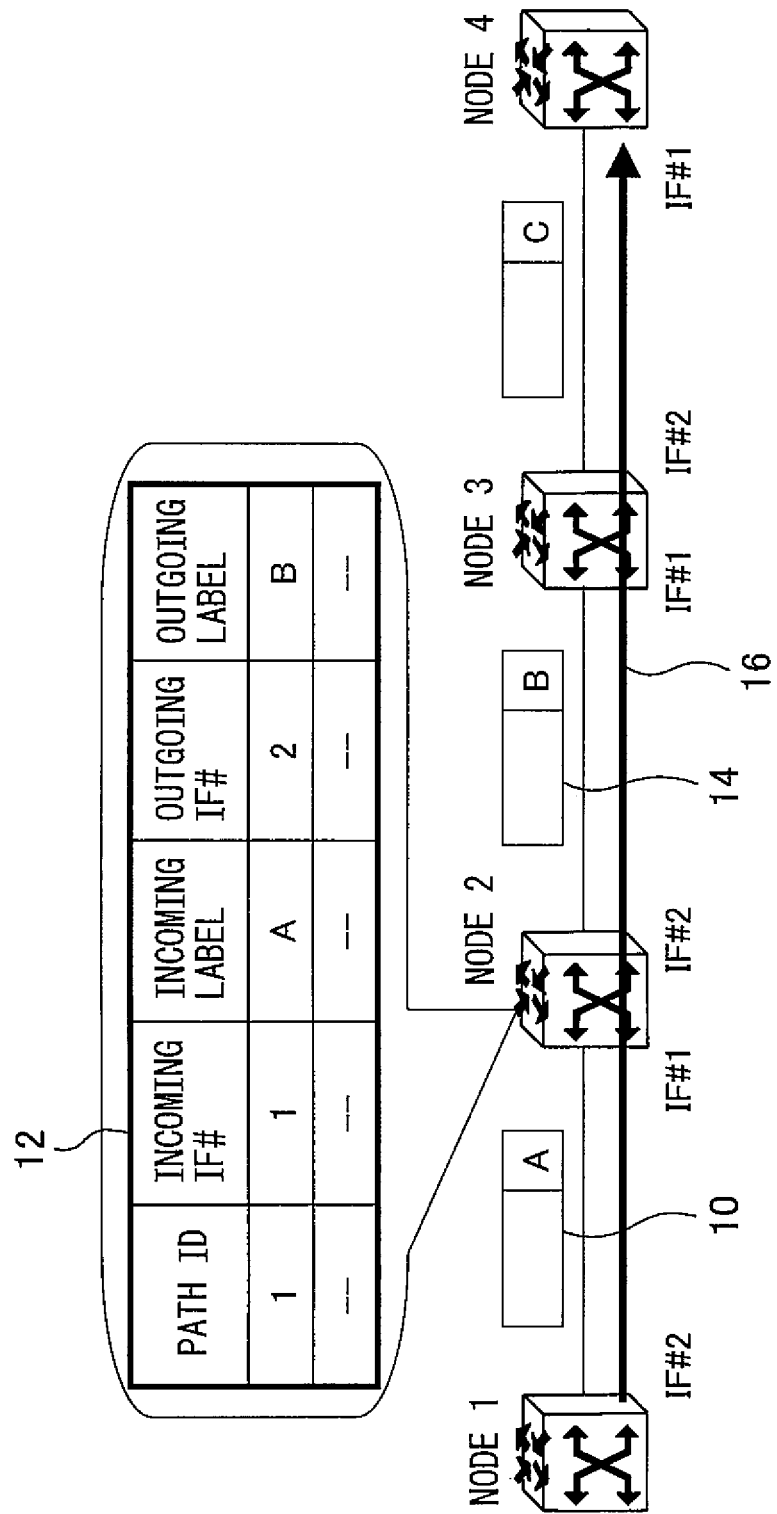
FIG. 1 is a diagram showing one example of MPLS.
Figure 2:
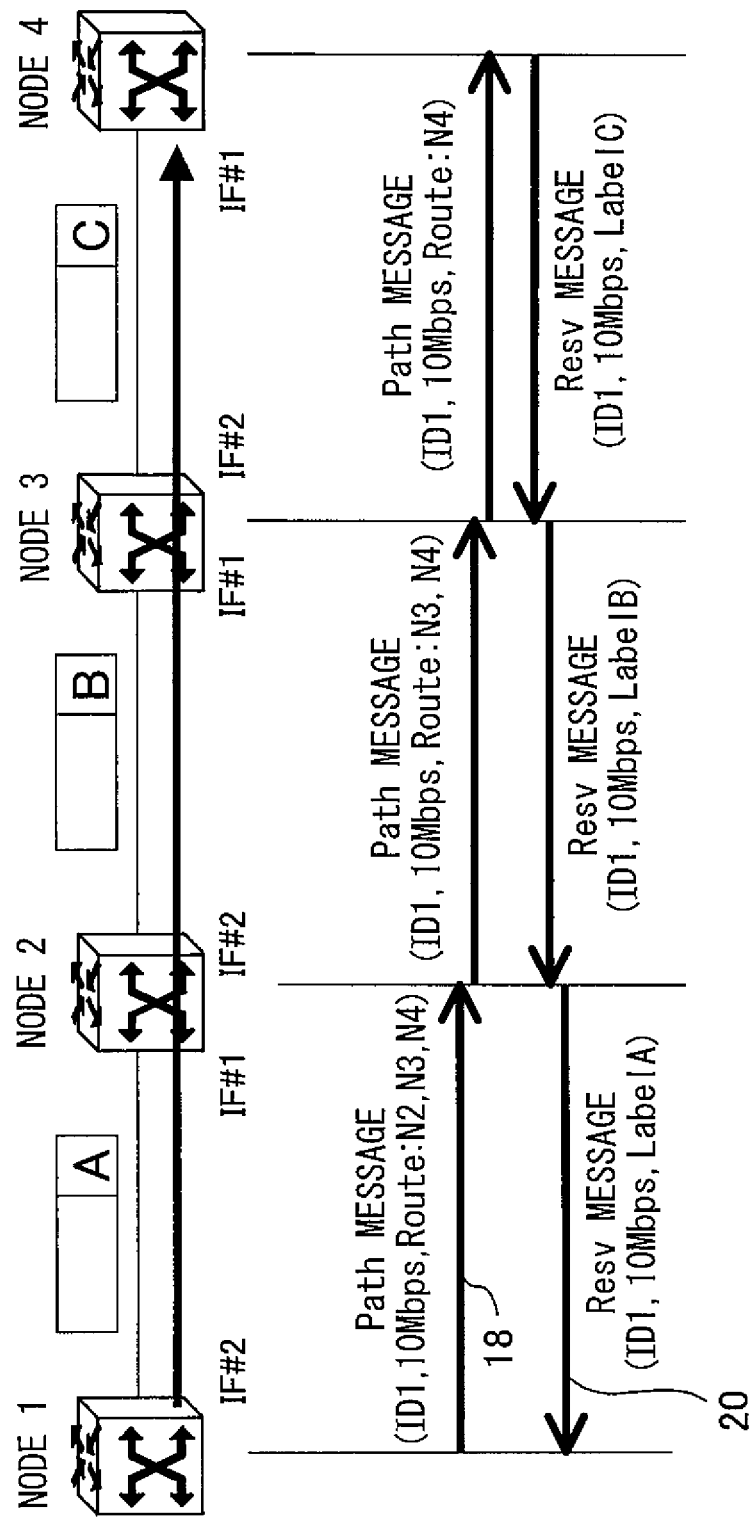
FIG. 2 is a signaling protocol used to construct a label table in MPLS.
Figure 3:
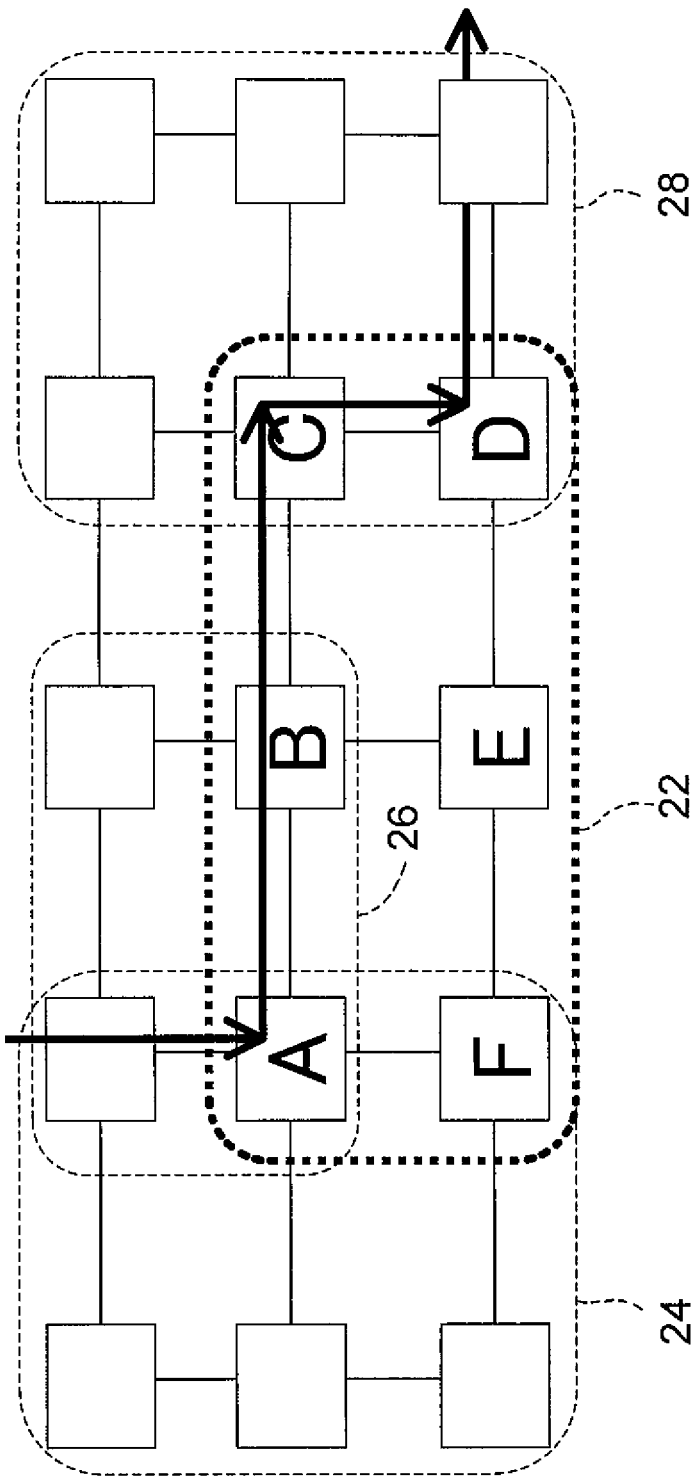
FIG. 3 is a diagram showing ring networks assumed within a mesh-like MPLS network.
Figure 4:
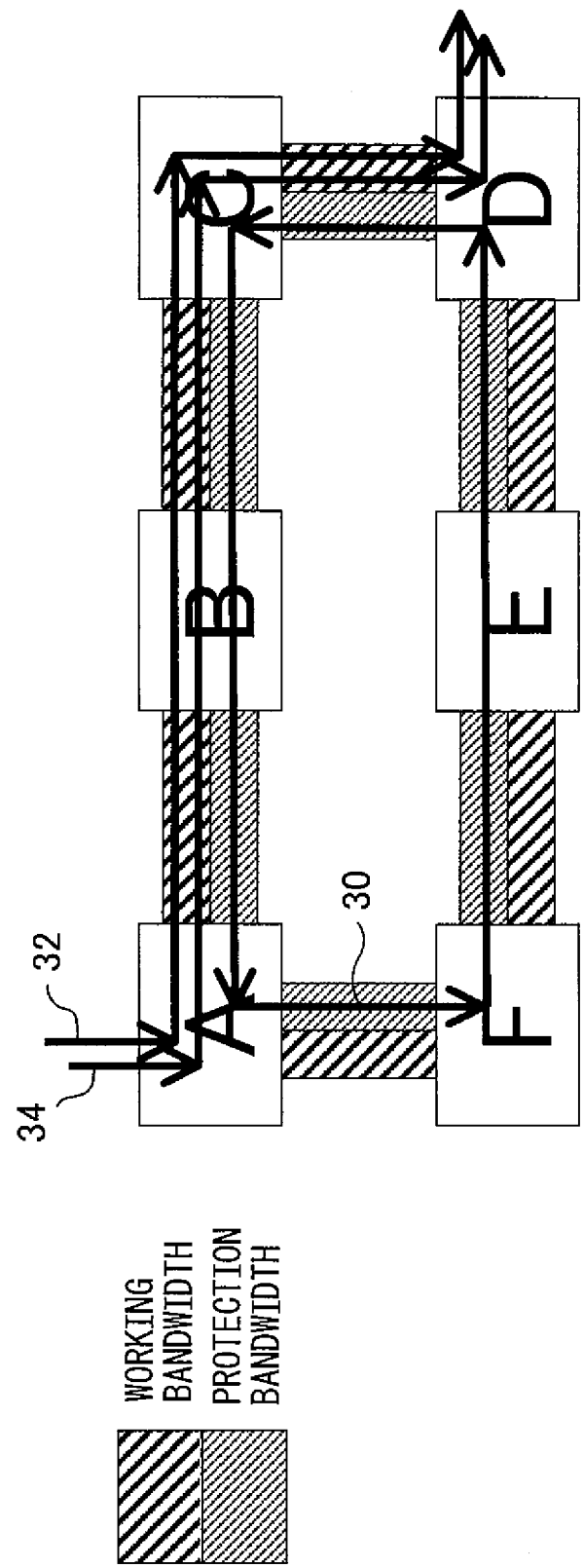
FIG. 4 is a diagram showing one example of a protection path set up in a ring configuration.
Figure 5:
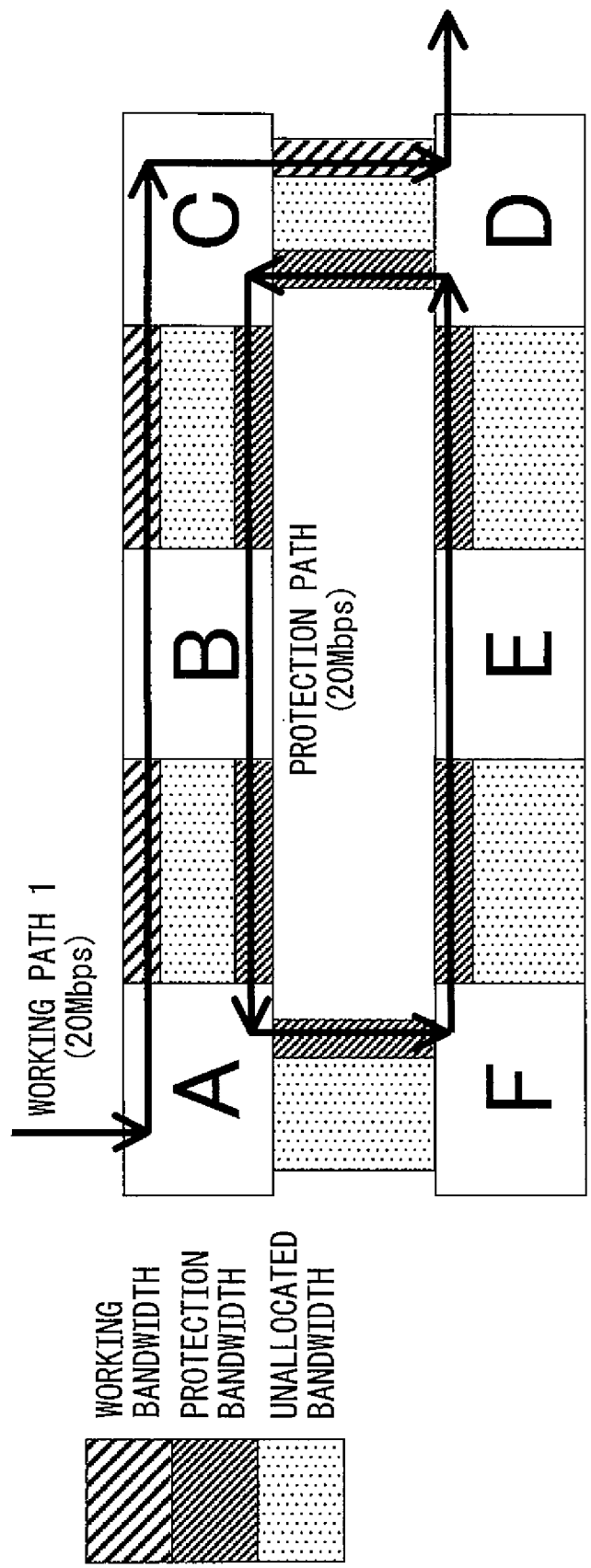
FIG. 5 is a diagram for explaining the bandwidth of a protection path set up to provide protection for a working path 1.

In FIG. 5, a working path 1 is set up along a route passing through nodes A, B, C, and D that forms a portion of the loop connecting the nodes A to F, and a loop protection path for protecting it is set up in the opposite direction to the direction in which the working path 1 is set up. Preferably, the protection path is not set up in advance, but is set up when working path 1 is set up, and the bandwidth is allocated to the protection path in accordance with the bandwidth of working path 1. In the illustrated example, since the bandwidth of working path 1 is 20 Mbps, the bandwidth allocated to the protection path is also 20 Mbps.

More specifically, when a PATH message requesting the setting up of the working path 1 is received at the node A, the protection path is set up before the message is transferred to the node B. In other words, the node A that received the PATH message for the working path 1 sets up a 20-Mbps path with the node A as both the starting point and endpoint in accordance with the previously described signaling protocol RSVP-TE. However, the node A actually is neither the starting point nor the endpoint of the protection path, but when a packet to be transferred on the protection path is received from its adjacent node B, the node A transfers it as the packet on the protection path to the next node F. The label table may be set up to effect such transfer.

Figure 6:
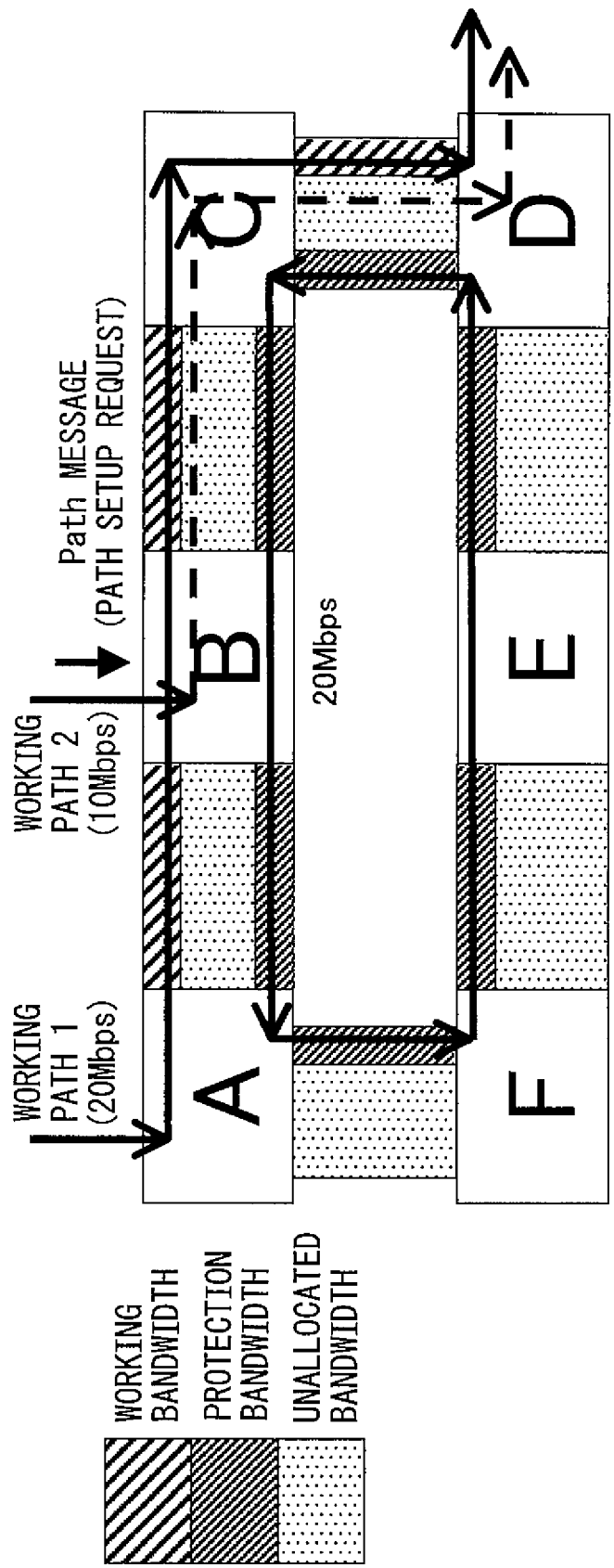
FIG. 6 is a diagram showing how the bandwidth of the protection path is changed according to a first embodiment.

Next, assume the case where, as shown in FIG. 6, the node B has received a PATH message requesting the setting up of a 10-Mbps working path 2 that passes through the nodes B, C, and D in this order and that requires the protection by the protection path.

The node B checks whether the bandwidth to be allocated to the working path 2 is available and, if the bandwidth is available, then compares the bandwidth of the protection path with the total bandwidth of the working paths to be protected by the protection path; here, if the bandwidth of the protection path is sufficient, processing continues to set up the working path 2, but if the bandwidth of the protection path is not sufficient, processing for changing the bandwidth of the protection path is initiated. In the illustrated example, since the bandwidth of the protection path is not sufficient, processing is performed to increase the bandwidth of the protection path to 30 Mbps.

Figure 7:
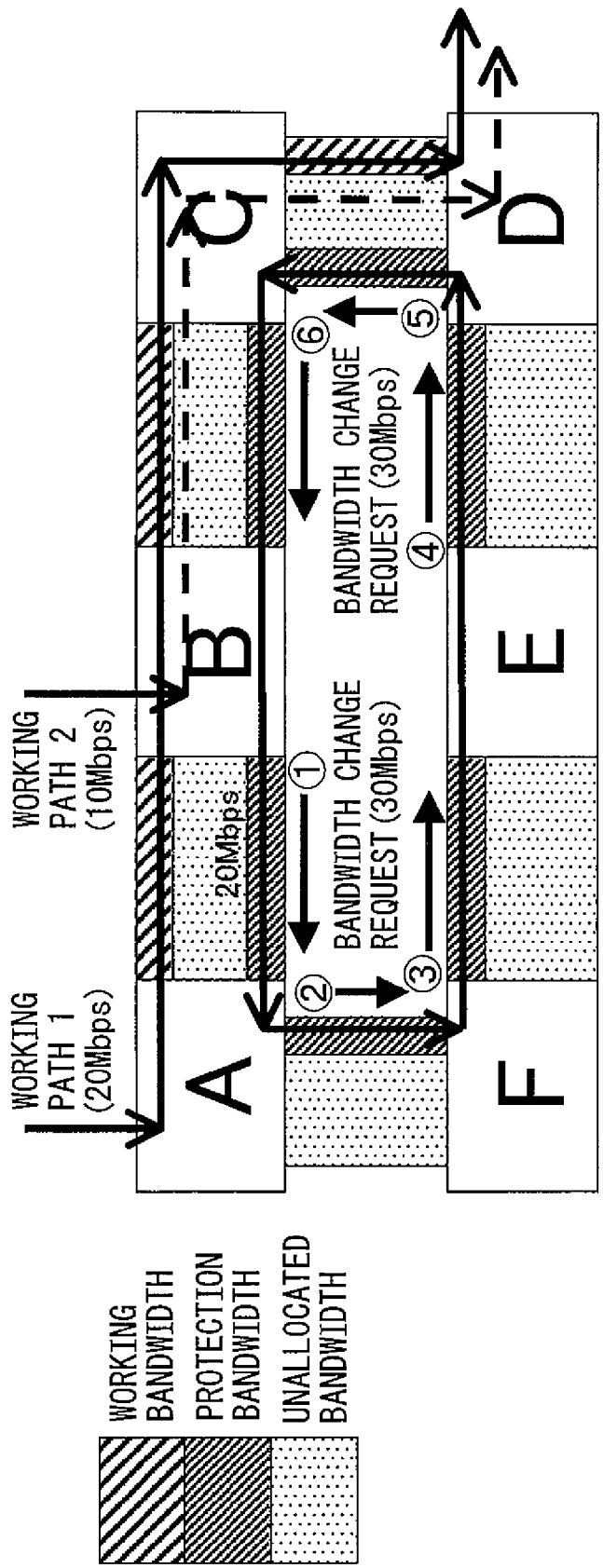
FIG. 7 is a diagram showing how the bandwidth of the protection path is changed according to the first embodiment.

As shown in FIG 7, a bandwidth change request message containing the identifier of the protection path and the requested bandwidth of 30 Mbps is transferred from the node B to its downstream node (i.e., the node A) along the protection path. The node A and each of the subsequent nodes F, E, D, and C that received the bandwidth change request message check whether the bandwidth can be changed in accordance with the bandwidth change request, and transfers the message downstream only when the bandwidth can be changed as requested. The node B that generated the bandwidth change request message waits for the bandwidth change request message it generated to be transferred from its upstream node.

Figure 8:
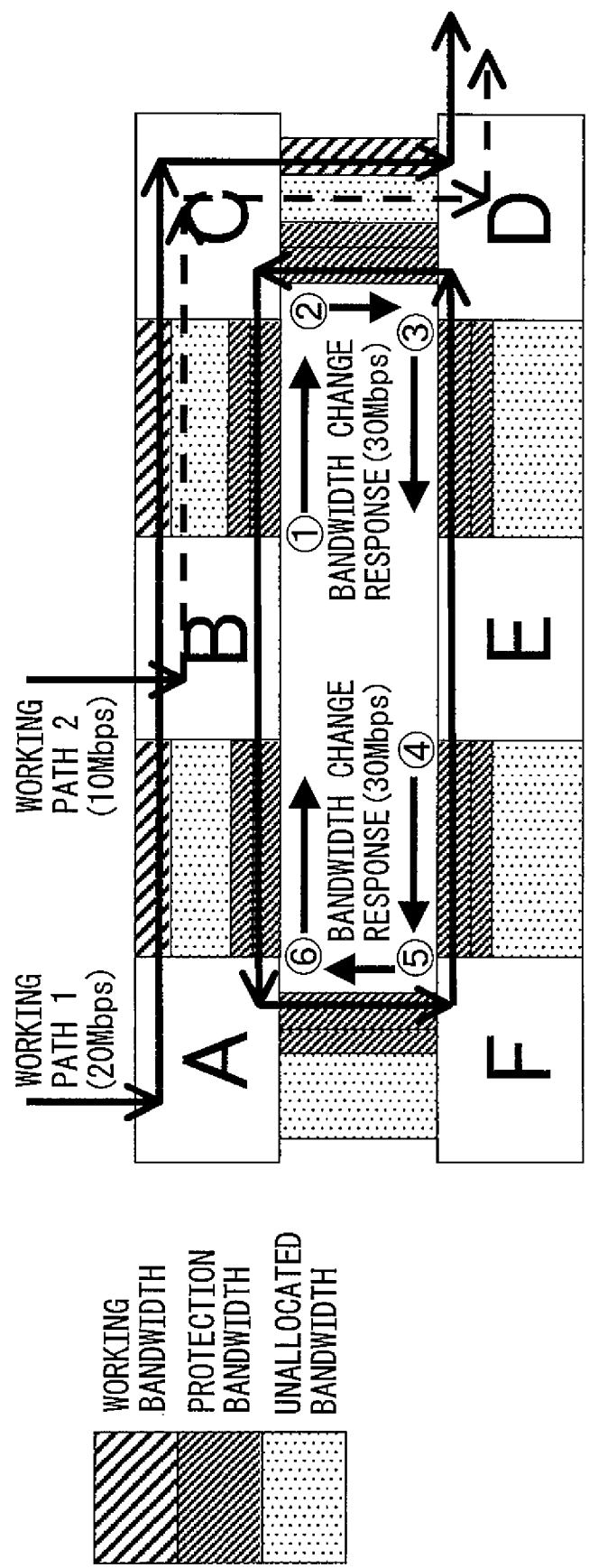
FIG. 8 is a diagram showing how the bandwidth of the protection path is changed according to the first embodiment.

The node B, upon receiving the bandwidth change request message it generated, changes the bandwidth of the protection path to the bandwidth specified in the bandwidth change request message. Then, as shown in FIG. 8, the node B sends a bandwidth change response message upstream along the protection path (that is, to the node C). Each of the nodes C, D, E, F, and A that received the bandwidth change response message changes the bandwidth of the protection path to the bandwidth specified in the bandwidth change request message. When the node B receives the bandwidth change response message it generated, this means that the bandwidth has been changed as requested at every node along the protection path.

Figure 9:
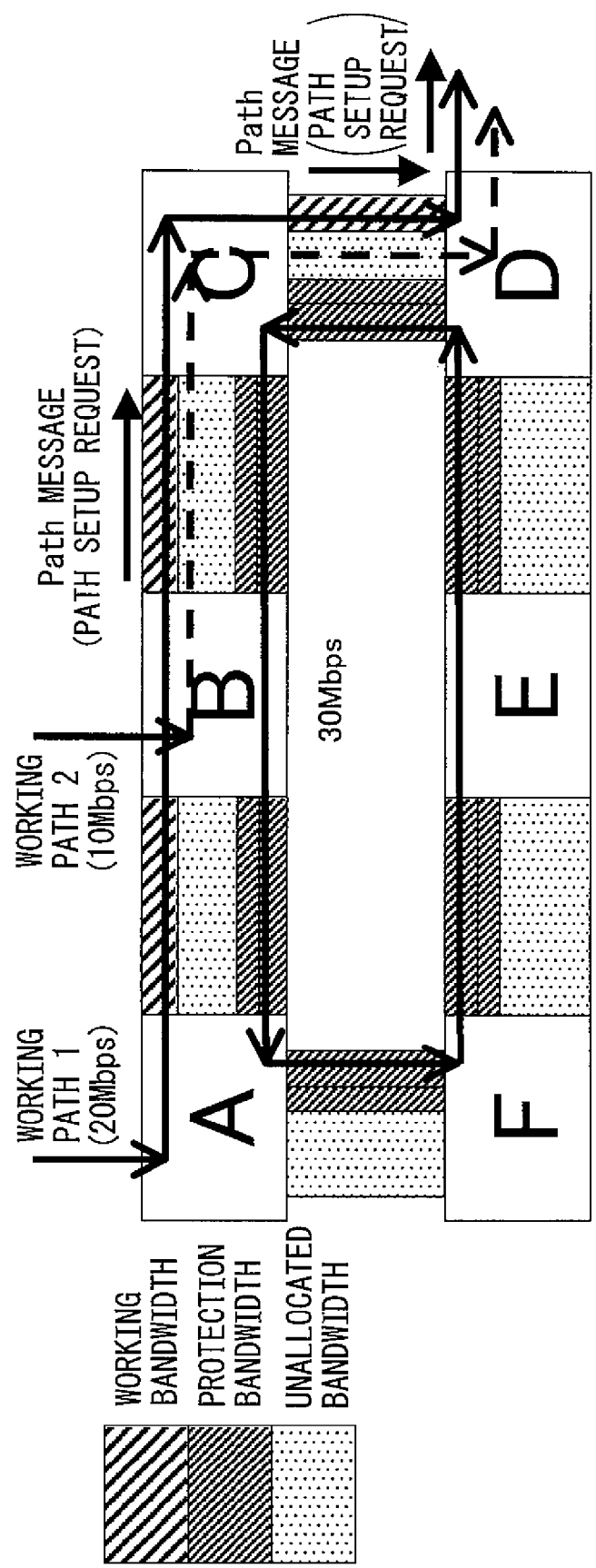
FIG. 9 is a diagram showing how the bandwidth of the protection path is changed according to the first embodiment.

Thereafter, as shown in FIG. 9, the node B sends the PATH message for the working path 2 to the next node (i.e., the node C) downstream along the working path 2, thus continuing the processing for setting up the working path 2.

Figure 10:
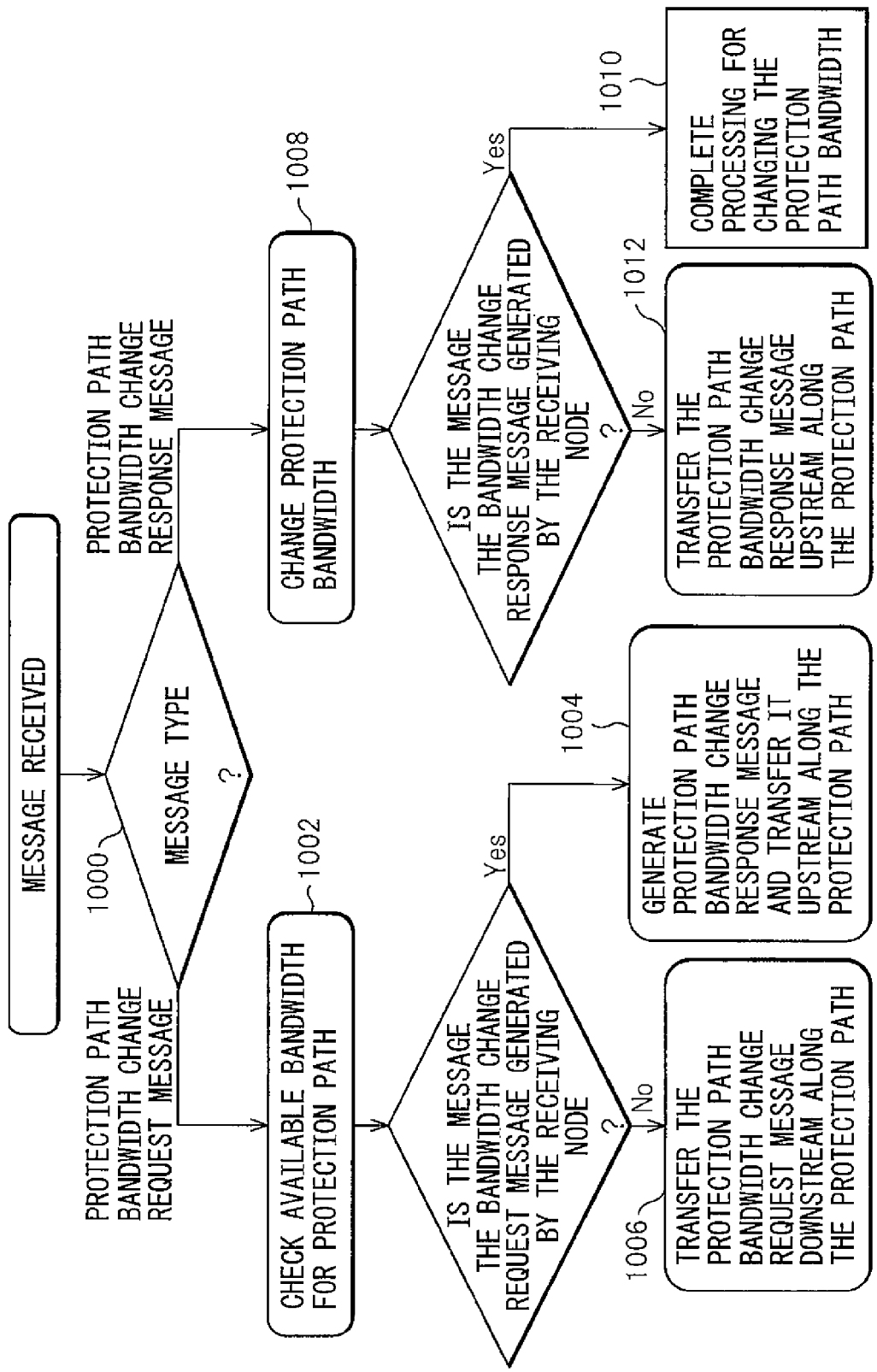
FIG. 10 is a flowchart illustrating the processing performed at each node according to the first embodiment.

FIG. 10 shows a flowchart illustrating the processing performed at each node upon reception of a message in the first embodiment of the present invention. In FIG. 10, first the message type of the received message is checked (step 1000); if the received message is the protection path bandwidth change request message, available bandwidth for the protection path is checked (step 1002). If the bandwidth available for the protection path is not sufficient, the following processing is not performed. Next, if the received message is the bandwidth change request message that has been generated by the receiving node itself, the protection path bandwidth change response message is generated and transferred upstream along the protection path (step 1004). Otherwise, the received message is transferred downstream along the protection path (step 1006).

If the received message is the protection path bandwidth change response message, the bandwidth of the protection path is changed (step 1008), and if the received message is one that has been generated by the receiving node itself, the processing for changing the bandwidth of the protection path is completed (step 1010); otherwise, the received message is transferred upstream (step 1012).

Figure 11:
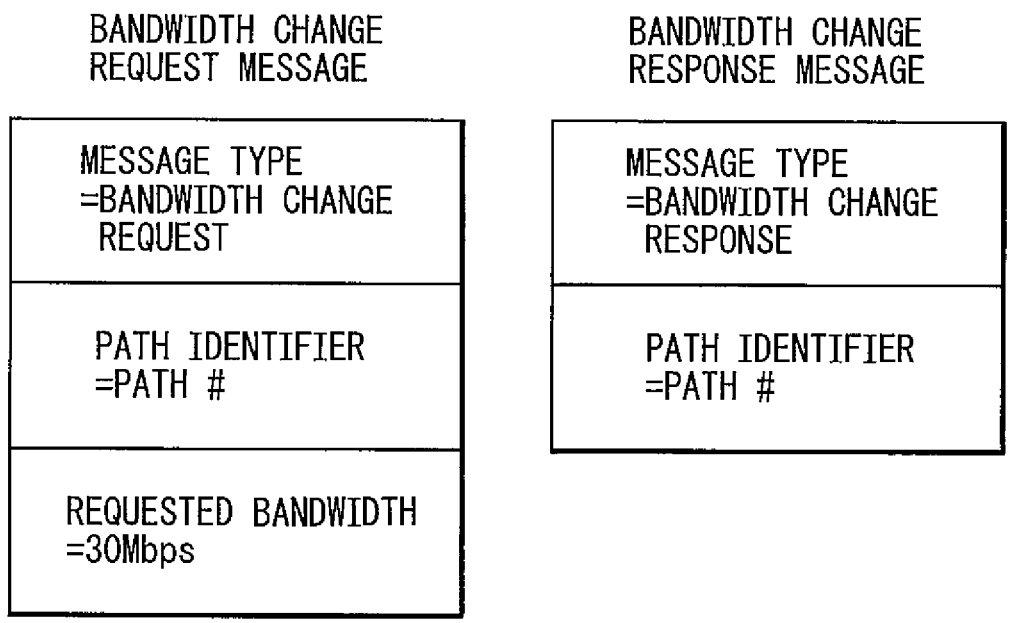
FIG. 11 is a diagram showing one example of a message format for changing the bandwidth.

As shown in FIG. 11, the bandwidth change request message contains "message type" indicating that the message is the bandwidth change request message, "path identifier" indicating the path whose bandwidth is to be changed, and "requested bandwidth," and the bandwidth change response message contains "message type" indicating that the message is the bandwidth change response message and "path identifier." "Requested bandwidth" may be included in the bandwidth change response message. If the "requested bandwidth" is included in the bandwidth change response message, the bandwidth is changed in accordance with the value of the requested bandwidth included in the message, and if it is not included, the value earlier specified in the bandwidth change request message is used.

The PATH message and the RESV message according to the previous described signaling protocol RSVP-TE may be used as the bandwidth change request message and the bandwidth change response message, respectively. Each node can recognize that the PATH message and the RESV message are respectively the bandwidth change request message and the bandwidth change response message by checking that the path identifier included in each received message matches that of the already established path.

In the above example, the bandwidth change request message is transferred upstream along the protection path, and the bandwidth change response message downstream along the protection path, but the transfer directions of the messages may be reversed, i.e., the bandwidth change request message may be transferred in the downstream direction and the bandwidth change response message in the upstream direction, or both messages may be transferred in the same direction, that is, both in the upstream direction or both in the downstream direction.

Alternatively, only the bandwidth change request message may be used. In that case, when the message is received, each node checks whether the bandwidth can be changed as requested and, only when the bandwidth can be changed, the node changes the bandwidth and transfers the message to the next node. In this case, the processing for the bandwidth change is completed when the node (in the above example, the node B) that generated the bandwidth change request message has received the message it generated, and the bandwidth change response message may be sent out and made to cycle once around the loop in order to notify each node on the loop that the processing has been completed.

The bandwidth changing procedure thus far described can be applied not only when changing the bandwidth of a loop protection path, but also when changing the bandwidth of a working path set up in a loop.

Figure 12:
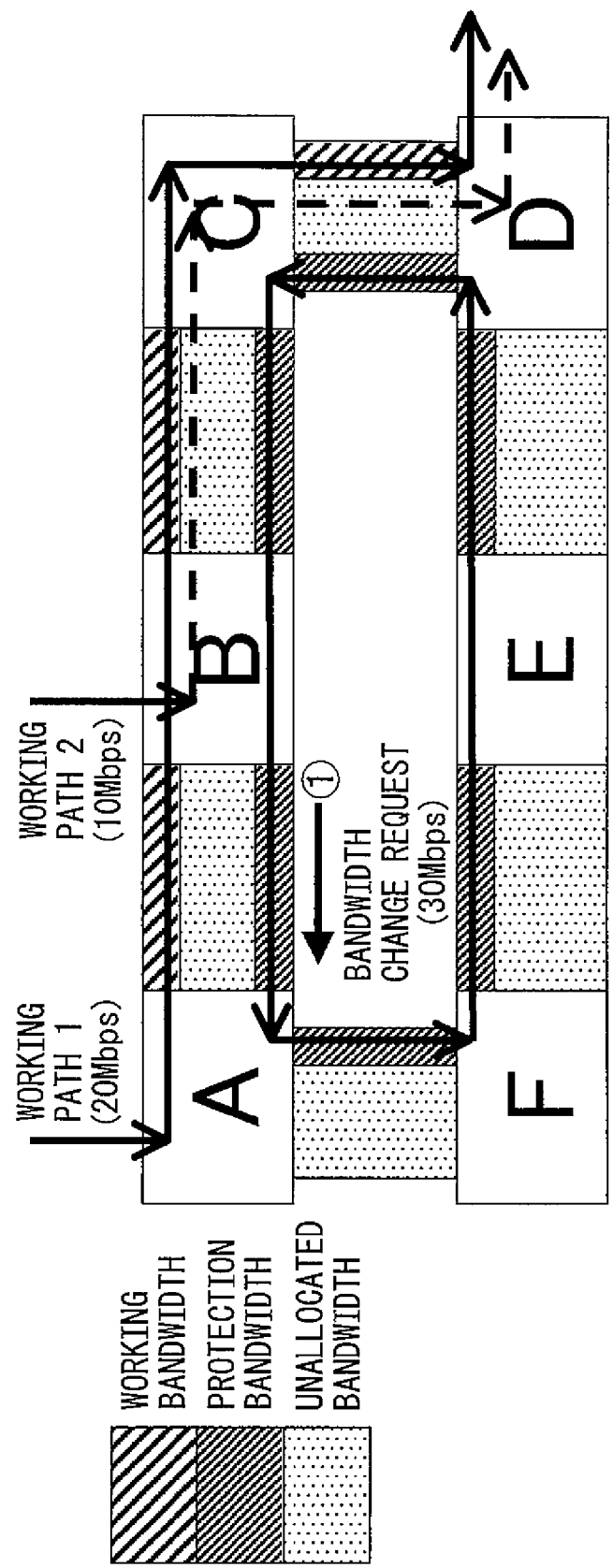
FIG. 12 is a diagram showing how the bandwidth of the protection path is changed according to a second embodiment.
Figure 13:
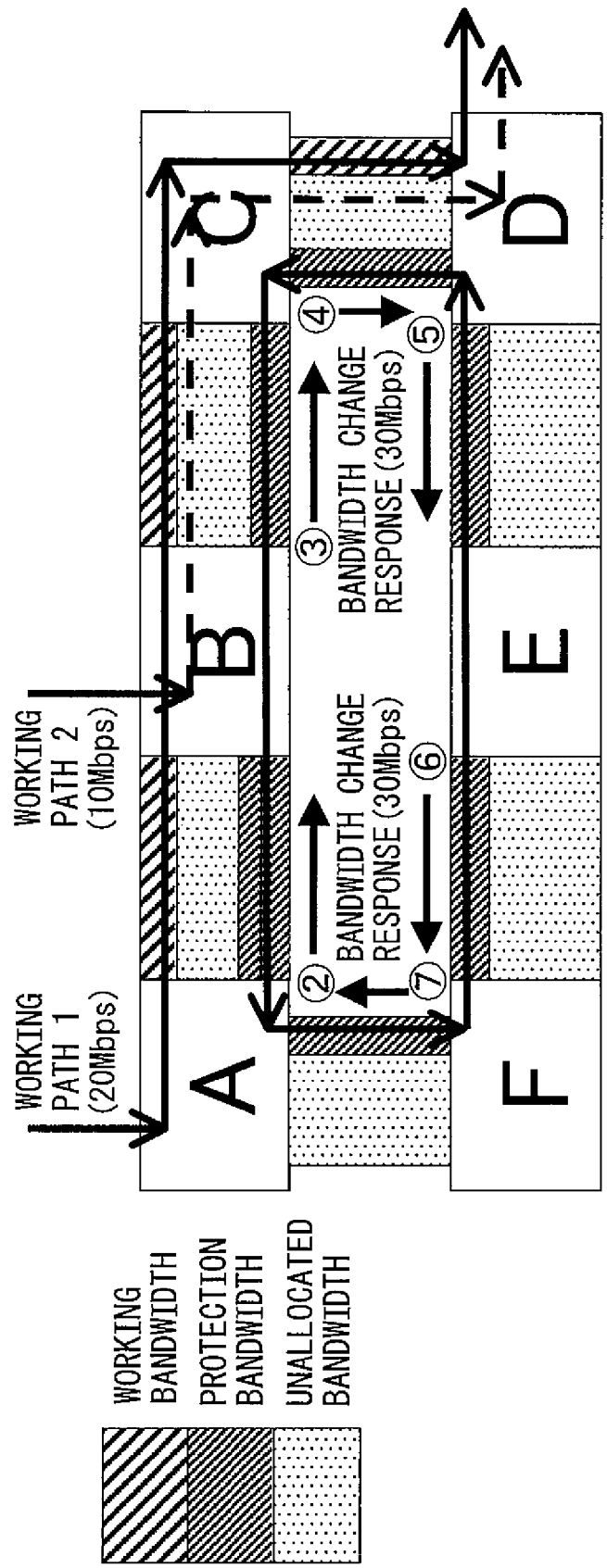
FIG. 13 is a diagram showing how the bandwidth of the protection path is changed according to the second embodiment.
Figure 14:
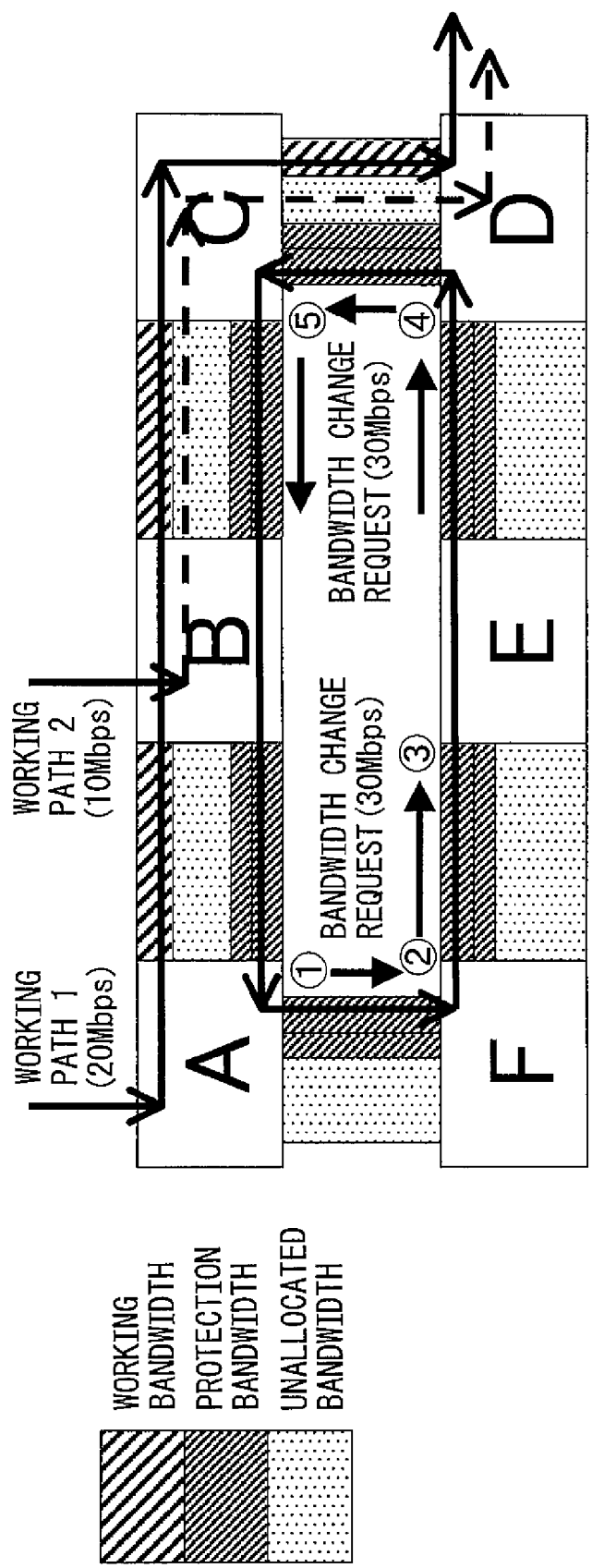
FIG. 14 is a diagram showing how the bandwidth of the protection path is changed according to the second embodiment.

FIGS. 12 to 14 shows a second embodiment of a bandwidth changing procedure according to the present invention. As in the foregoing embodiment, in response to the setup request for the working path 1, the working path 1 is set up and, at the same time, the protection loop is set up in a loop. In FIG. 12, when the node B that received the PATH message for the working path 2 determines that the bandwidth of the protection path needs to be changed, the node B transfers the bandwidth change request message containing the path identifier of the protection path and the requested bandwidth (30 Mbps) in the downstream direction along the protection path toward the node A which is the endpoint of the protection path. If there is some other node between the node B and the node A at the endpoint of the protection path (though there is no such other node in the illustrated example), such other node checks whether the bandwidth can be changed in accordance with the bandwidth change request, and transfers the message downstream only when the bandwidth can be changed as requested. The node A at the endpoint of the protection path checks whether the bandwidth can be changed in accordance with the bandwidth change request, and returns the bandwidth change response message upstream along the protection path (to the node B) as shown in FIG. 13 if the bandwidth can be changed as requested.

The processing to be performed at the node that received the bandwidth change response message differs depending on whether or not the node has already received (or sent) the bandwidth change request message.

If there is some other node between the node A and the node B (though there is no such other node in the illustrated example), since such other node has already received the bandwidth change request message, the node changes the bandwidth of the protection path to the bandwidth specified in the bandwidth change request message, and transfers the message to the next node. This also applies to the node B that originally transmitted the bandwidth change request message.

On the other hand, at each of the nodes C, D, E, and F, since the bandwidth change request message is not yet received, the node regards the bandwidth change response message as being the bandwidth change request message, checks whether the bandwidth can be changed as requested, and transfers the message to the next node only when the bandwidth can be changed. In other words, at the stage of FIG. 13, the bandwidth change is completed only for the link between the nodes A and B.

When the node A at the starting point of the protection path receives the bandwidth change response message, the node A changes the bandwidth of the protection path to the bandwidth specified in the message. Then, as shown in FIG. 14, the bandwidth change request message previously received from the node B is transferred downstream along the protection path (to the node F).

The nodes F, E, D, and C that received the bandwidth change request message had not received the bandwidth change request message before, but had received only the bandwidth change response message. Therefore, each of these nodes regards the bandwidth change request message as being the bandwidth change response message, and changes the bandwidth of the protection path to the bandwidth specified in the message.

The node B is waiting for the message identical to the bandwidth change request message it generated (FIG. 12) to be transferred from its upstream node C on the protection path, and when the node B receives the bandwidth change request message, this means that the bandwidth has been changed as requested at every node along the protection path.

As described above, in the second embodiment of the present invention, each node does not necessarily receive the bandwidth change request message and the bandwidth change response message in the usual order. Each node regards the first received message as the bandwidth change request message and checks whether the bandwidth for the protection path is available or not, and regards the subsequently received message as the bandwidth change response message and changes the bandwidth as requested.

Figure 15:
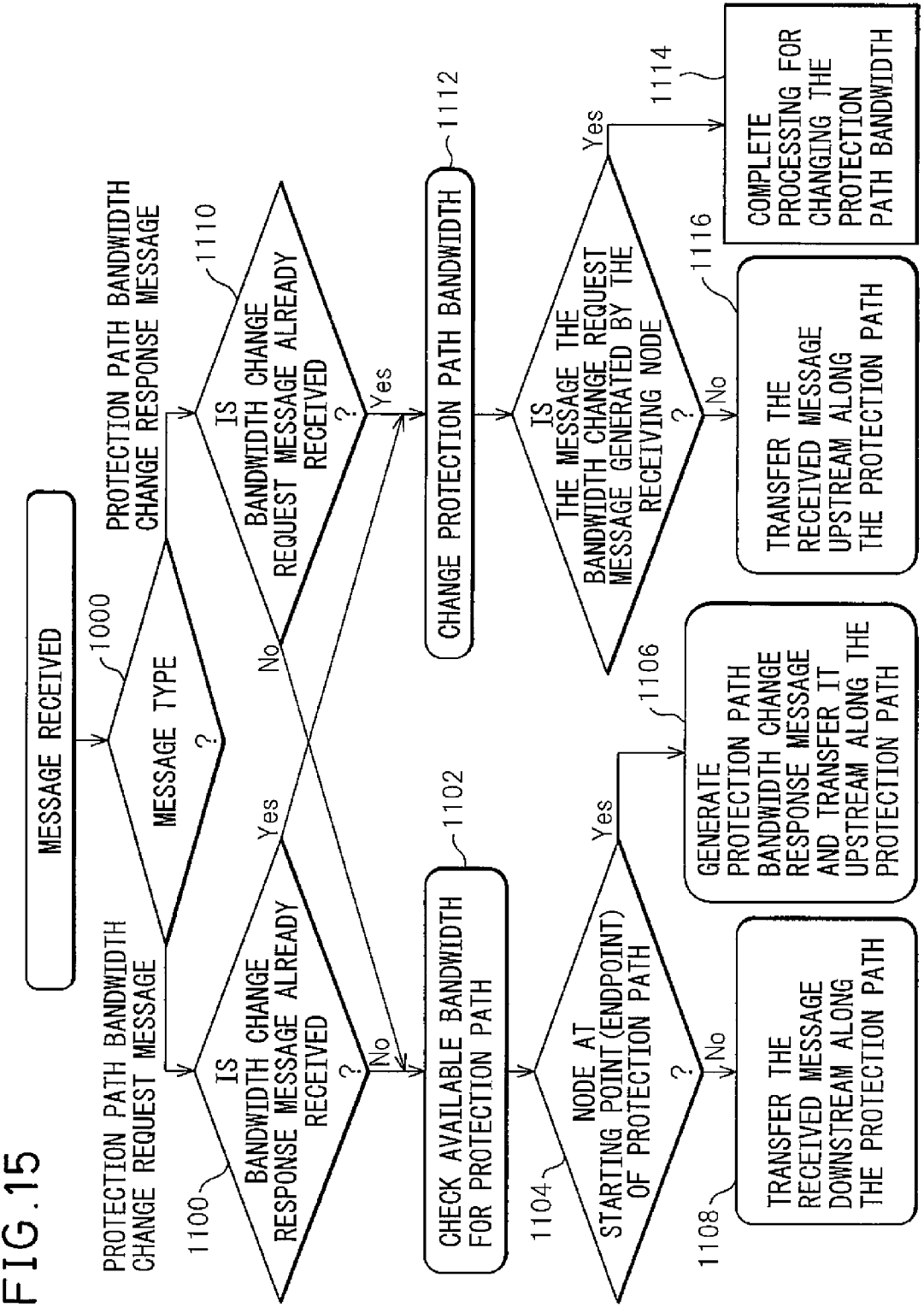
FIG. 15 is a flowchart illustrating the processing performed at each node according to the second embodiment.

FIG. 15 shows the processing performed at each node upon reception of a message in the second embodiment of the present invention. If the received message is the protection path bandwidth change request message, it is determined whether or not the node has already received the bandwidth change response message (step 1100). If not yet received, then since the currently received message is really the bandwidth change request message, the node checks available bandwidth for the protection path (step 1102).

If there is no available bandwidth, the following processing is not performed. Next, it is determined whether the node is the endpoint of the protection path (step 1104); if the node is the endpoint, the node generates a protection path bandwidth change response message and sends it upstream along the protection path (step 1106), but if it is not, it transfers the received message downstream along the protection path (step 1108). In step 1100, if the node has already received the bandwidth change response message, then the currently received message is regarded as being the bandwidth change response message, and the process proceeds to perform processing to change the bandwidth as described below.

If the received message is the protection path bandwidth change response message, it is determined whether or not the node has already received the bandwidth change request message (step 1110). If not yet received, then the currently received message is regarded as being the bandwidth change request message, and the process proceeds to step 1102 to perform the above-described processing. On the other hand, if already received, then since the currently received message is really the bandwidth change response message, the bandwidth of the protection path is changed (step 1112). Then, if the received message is the message the node generated, the protection path bandwidth changing process is completed (step 1114); otherwise, the received message is transferred upstream along the protection path (step 1116).

Figure 16:
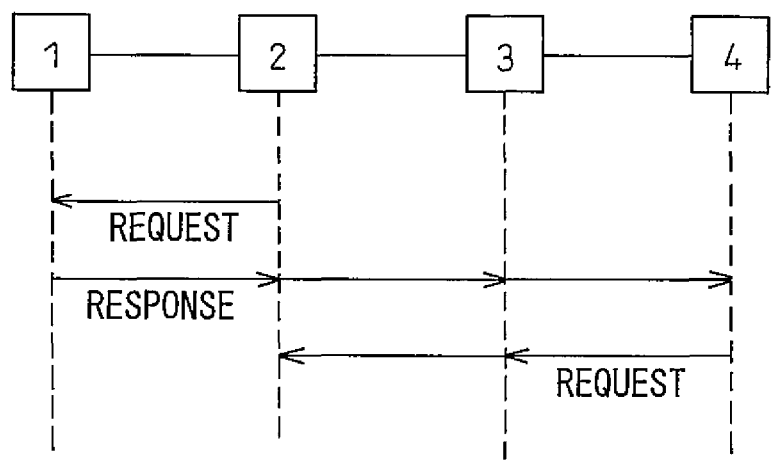
FIG. 16 is a diagram showing a procedure for changing the bandwidth of a linear path.

In the method shown in the second embodiment, since the message is always looped back at the node A which is both the starting point and endpoint of the protection path, the method can be applied not only when changing the bandwidth of a loop path, but can also be applied directly to the case where the bandwidth of an ordinary linear path whose endpoint is different from the starting point is changed starting from an intermediate node along the path, as shown in FIG. 16. More specifically, FIG. 16 shows the path originating at the node 1 and terminating at the node 4; here, the node 2 sends a bandwidth change request message to the path originating node 1 which, in response, transfers the bandwidth change response message to the terminating node 4, which then transfers to the node 2 the message identical to the bandwidth change request message sent out from the node 2, to complete the bandwidth change.

In the case of a loop path, each message may be transferred in either the upstream direction or the downstream direction along the path. However, the bandwidth change request message to be sent out from the bandwidth change starting node (in the example of FIGS. 12 to 14, the node B) and the bandwidth change request message to be transferred up to the starting node must be directed in the same direction.

Figure 17:
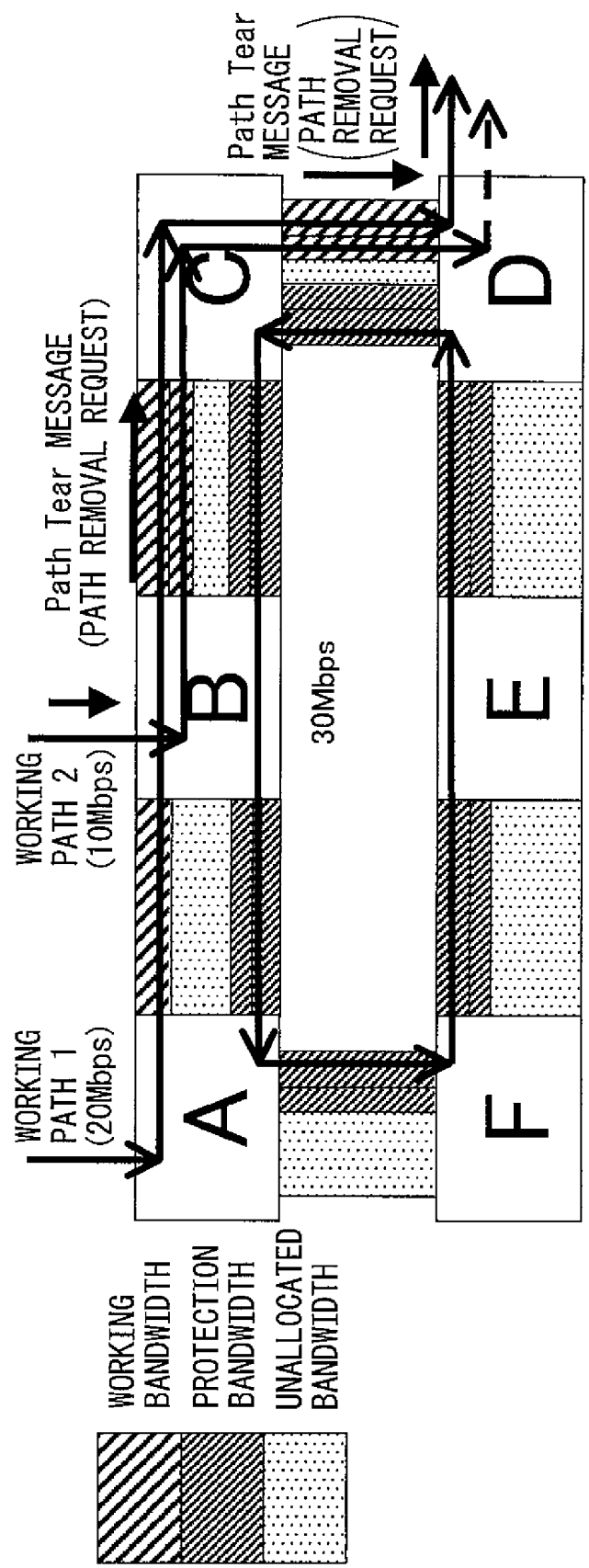
FIG. 17 is a diagram showing one example of a procedure for reducing protection path bandwidth.

As shown in FIG. 17, when a message requesting the removal of the working path 2 using, for example, a bandwidth of 10 Mbps is received at the node B, the message is transferred further downstream to accomplish the removal the working path 2, and at the same time, processing is performed to reduce the bandwidth of the loop protection path currently allocated a bandwidth of 30 Mbps, for example, to 20 Mbps. The processing for reducing the bandwidth is essentially the same as the processing for increasing the bandwidth so far described, except that the bandwidth after the change is smaller than the bandwidth before the change; therefore, the bandwidth changing process so far described can be directly applied here.

Figure 18:
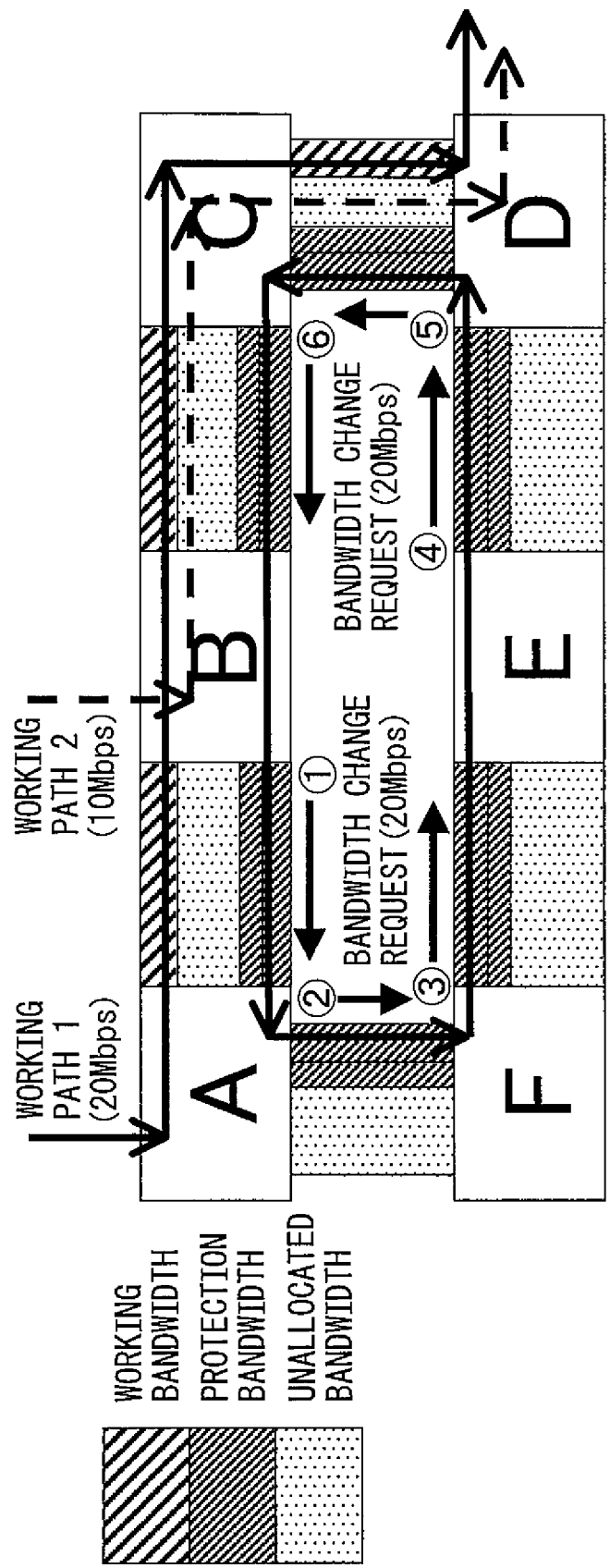
FIG. 18 is a diagram showing one example of the procedure for reducing protection path bandwidth.

As an example, when the node B recognizes that the total bandwidth of all the working paths becomes smaller than the bandwidth of the protection path as a result of the working path removal, the node B first transfers a bandwidth change request message containing the identifier of the protection path and indicating the changed bandwidth (in the illustrated example, 20 Mbps) downstream along the protection path, i.e., to the node A, as shown in FIG. 18. Each node that received the bandwidth change request message checks whether the bandwidth can be changed as requested, however, in the case of reducing the bandwidth, the bandwidth change is always possible. The node B that generated the bandwidth change request message waits for the bandwidth change request message it generated to be transferred from its upstream node along the protection path.

Figure 19:
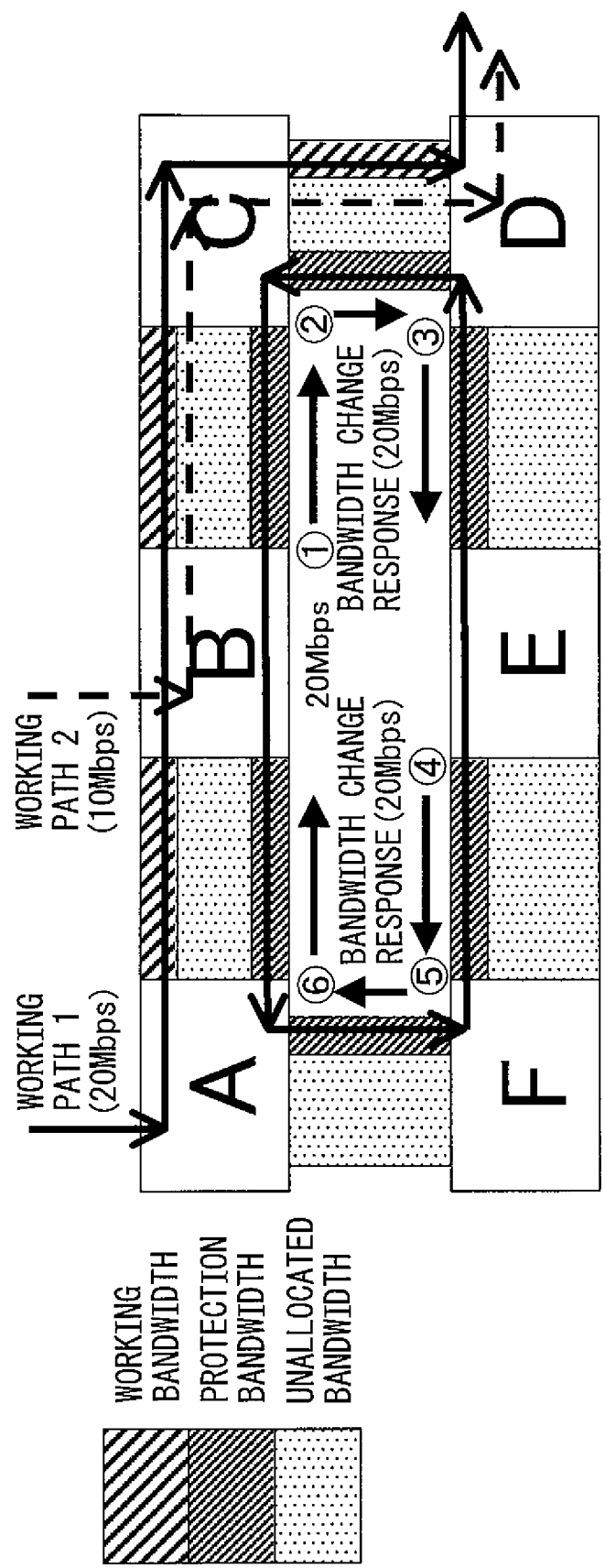
FIG. 19 is a diagram showing one example of the procedure for reducing protection path bandwidth.

When the bandwidth change request message is received, the node B changes the bandwidth of the protection path to the bandwidth specified in the message, and sends out the bandwidth change response message upstream along the protection path (i.e., to the node C) as shown in FIG. 19.

Each node that received the bandwidth change response message changes the bandwidth of the protection path to the bandwidth specified in the message, and transfers the message to the next node. When the node B receives the bandwidth change response message it generated, the processing for reducing the protection path bandwidth is completed.

The above embodiments can be implemented by a computer and a software program.

The invention claimed is:
1. A method of managing protection path bandwidth comprising:
   allocating the protection path bandwidth to a fixedly set loop protection path along a single ring loop for working path along the same single ring loop in accordance a bandwidth requested by the working path to be set up or removed;
   setting up, at a first node among said nodes, the loop protection path in said single ring loop in response to a first request for setting up a first working path passing through a first portion of said single ring loop;
   comparing, at the first node, in response to a second request from a second node among said nodes for setting up or removing a second working path passing through a second portion of said loop, a bandwidth of paths to be protected when said second path is set up or removed at the second node with a bandwidth of said loop protection path; and
   changing the bandwidth of said loop protection path at each of said nodes within said ring loop in accordance with a result of said comparison, wherein
   said comparison is made at said first node that received, earlier than any other node on said loop, a first message requesting, at the second node, the setting up or removal of said second working path, and
   changing, at each said node, the bandwidth of said protection path includes transferring from said first node along said loop a second message requesting the changing of the bandwidth of said loop protection path.

2. A method according to claim 1, wherein the changing of the bandwidth of said loop protection path is completed when said second message from said first node returns to the first node.

3. A method according to claim 2, wherein said second message is transferred from said first node downstream along said loop protection path.

4. A method according to claim 1, wherein said second message returns to said first node after one cycle around said loop and the changing of the bandwidth of said loop protection path is completed, at each said node, by sending out in response thereto from said first node a third message that cycles once around said loop.

5. A method according to claim 4, wherein said second message is transferred from said first node downstream along said loop protection path, and said third message is transferred from said first node upstream along said loop protection path.

6. A method according to claim 1, wherein said protection path is set up by setting as a starting point and an endpoint said second node that received, earlier than any other node on said loop, a message requesting the setting up of said first working path, and
   in response to arrival of said second message at said second node, said second node sends out a third message that cycles once around said loop and, in response thereto, said second node sends out a fourth message that is transferred up to said first node in the same direction as said second message and the changing of the bandwidth of said loop protection path is completed, at each said node, by transferring the fourth message.

7. A method according to claim 6, wherein said second message is transferred from said second node downstream along said loop protection path, and said fourth message is transferred from the second node upstream along said loop protection path.

8. A method of managing a bandwidth of a loop protection path, when using the loop protection path set up in a loop having a plurality of nodes to recover from a failure occurring in at least a portion of a working path, wherein setting up, at a first node among said nodes, the loop protection path in said loop in response to a first request for setting up a first working path passing through a first portion of said loop, comparing, at the first node, in response to a second request from a second node among said nodes for setting up or removing a second working path passing through a second portion of said loop, a bandwidth of paths to be protected when said second working path is set up or removed at the second node, with a bandwidth of said loop protection path, and changing the bandwidth of said loop protection path at each of said nodes in accordance with a result of said comparison, the managing is achieved by said second node with said first node set as a starting point and an end point in said loop, said method comprising:
   allocating the protection path bandwidth to a fixedly set loop protection path along a single ring loop for a working path along the same single ring loop in accordance with a bandwidth requested by the working path to be set up or removed;
   comparing, at said first node, in response to a first message received from a node outside said loop requesting setting up or removing a working path passing through a portion of said loop, a bandwidth of paths to be protected when the requested working path is set up or removed, with a bandwidth of said loop protection path; and
   sending a second message from said first node to one of adjacent nodes on said loop to request changing the bandwidth of said loop protection path within said single ring loop in accordance with a result of said comparison.

9. A method according to claim 8, wherein said second message cycles once around said loop,
   said method further comprising sending out a third message, from said first node, which cycles once around said loop, to one of said adjacent nodes when said second message is received from one of said adjacent nodes, to thereby complete the changing of the bandwidth of said loop protection path at each said node.

10. A method according to claim 8, wherein the changing of the bandwidth of said loop protection path is completed when a third message is received, said third message being sent out from said second node in response to reception of a fourth message, said fourth message being sent out from said second node in response to arrival of said second message at said second node, said fourth message cycling once around said loop, said third message being sent out in the same direction as said second message.

11. A method of managing a bandwidth of a loop protection path when using the loop protection path set up in a loop having a plurality of nodes to recover from a failure occurring in at least a portion of a working path, wherein setting up, at a first node among said nodes, the loop protection path in said loop in response to a first request for setting up a first working path passing through a first portion of said loop, comparing, at the first node, in response to a second request from a second node among said nodes for setting up or removing a second working path passing through a second portion of said loop, a bandwidth of paths to be protected when said second working path is set up or removed at the second node, with a bandwidth of said loop protection path, and changing the bandwidth of said loop protection path at each of said nodes in accordance with a result of said comparison, the managing is achieved by said first node set as a starting point and an end point of said protection path, said method comprising:

allocating the protection path bandwidth to a fixedly set loop protection path along a single ring loop for a working path along the same single ring loop in accordance with a bandwidth requested by the working path to be set up or removed;

setting up said loop protection path with said first node as the starting point and the endpoint when a first message requesting the setting up of the first working path passing through the portion of said loop is received from a node outside said loop;

sending out a second message that cycles once around said loop, when a third message requesting changing a bandwidth of said loop protection path within said single ring loop is received from the second node that received, earlier than any other node on said loop, a fourth message requesting the setting up or removal of the second working path passing through the portion of said loop; and sending out, in response to reception of said second message, a fifth message that is transferred up to said second node in the same direction as said third message.

12. A method of changing bandwidth of a path when using the loop protection path set up in a loop having a plurality of nodes to recover from failure occurring in at least a portion of a working path, wherein setting up, at a first node among said nodes set as a starting point and an ending point of said loop protection path, the loop protection path in said loop in response to a first request for setting up a first path passing through a first portion of said loop, comparing, at the first node, in response to a second request from a second node among said nodes for setting up or removing a second working path passing through a second portion of said loop, a bandwidth of paths to be protected when said second path is set up or removed at the second node, with a bandwidth of said loop protection path, and changing the bandwidth of said loop protection path at each of said nodes in accordance with a result of said comparison, said method comprising:

allocating the protection path bandwidth to a fixedly set loop protection path along a single ring loop for a working path along the same single ring loop in accordance with a bandwidth requested by the working path to be set up or removed;

sending out from the second node a first message that cycles once around said loop, said second node being a node different from said first node on said loop; and in response to reception of said first message, sending out from said second node a second message that cycles once around said loop.

13. A method of changing bandwidth of a path when using the loop protection path set up in a loop having a plurality of nodes to recover from a failure occurring in at least a portion of a working path, wherein setting up, at a first node among said nodes set as a starting point and an ending point of said loop protection path, the loop protection path in said loop in response to a first request for setting up a first working path passing through a first portion of said loop, comparing, at the first node, in response to a second request from a second node among said nodes for setting up or removing a second working path passing through a second portion of said loop, a bandwidth of paths to be protected when said second working path is set up or removed at the second node, with a bandwidth of said loop protection path, and changing the bandwidth of said protection path at each of said nodes in accordance with a result of said comparison, and the changing is achieved from a third node which is a node on said loop other than said first and second nodes, said method comprising:

allocating the protection path bandwidth to a fixedly set loop protection path along a single ring loop for a working path along the same single ring loop in accordance with a bandwidth requested by the working path to be set up or removed;

transferring a first message along said loop protection path from said third node to one of said first and second nodes;

transferring, in response to reception of said first message, a second message along said loop protection path from one of said first and second nodes to the other one of said first and second nodes; and transferring, in response to reception of said second message, a third message along said loop protection path from said other one of said first and second nodes to said third node.

* * * * *